(12) United States Patent
Brownlow et al.

(10) Patent No.: US 8,468,276 B2
(45) Date of Patent: *Jun. 18, 2013

(54) CONFIGURING AN INPUT/OUTPUT ADAPTER

(75) Inventors: Sean T. Brownlow, Rochester, MN (US); John R. Oberly, III, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/460,708

(22) Filed: Apr. 30, 2012

(65) Prior Publication Data

US 2012/0215947 A1   Aug. 23, 2012

Related U.S. Application Data

(63) Continuation of application No. 12/953,938, filed on Nov. 24, 2010, now Pat. No. 8,301,806.

(51) Int. Cl.
*G06F 3/00* (2006.01)
(52) U.S. Cl.
USPC .................................. 710/10; 710/8
(58) Field of Classification Search
None
See application file for complete search history.

(56) References Cited

U.S. PATENT DOCUMENTS

| | | | |
|---|---|---|---|
| 6,003,097 A * | 12/1999 | Richman et al. | 710/8 |
| 2009/0248937 A1 | 10/2009 | Solomon et al. | |
| 2009/0276773 A1 | 11/2009 | Brown et al. | |
| 2009/0313391 A1 | 12/2009 | Watanabe | |
| 2010/0014526 A1 | 1/2010 | Chavan et al. | |
| 2010/0082874 A1 | 4/2010 | Baba et al. | |
| 2010/0095310 A1 | 4/2010 | Oshins | |
| 2010/0180274 A1 | 7/2010 | Cherian et al. | |

OTHER PUBLICATIONS

U.S. Appl. No. 12/953,938, Notice of Allowance dated Jun. 22, 2012, (7 pgs).
U.S. Appl. No. 12/953,938, Non-Final Office Action dated Jan. 11 2012, (9 pgs).

* cited by examiner

*Primary Examiner* — Idriss N Alrobaye
*Assistant Examiner* — Ronald Modo
(74) *Attorney, Agent, or Firm* — Toler Law Group

(57) ABSTRACT

A computer-implemented method includes initializing a driver associated with an input/output adapter in response to receiving an initialize driver request from a client application. The computer-implemented method includes initializing the input/output adapter to enable adapter capabilities of the input/output adapter to be determined. The computer-implemented method also includes determining the adapter capabilities of the input/output adapter. The computer-implemented method further includes determining slot capabilities of a slot associated with the input/output adapter. The computer-implemented method also includes setting configurable capabilities of the input/output adapter based on the adapter capabilities and the slot capabilities.

19 Claims, 12 Drawing Sheets

CONFIGURING AN INPUT/OUTPUT ADAPTER

I. CLAIM OF PRIORITY

This application is a continuation patent application of, and claims priority from, U.S. patent application Ser. No. 12/953,938, filed on Nov. 24, 2010 and entitled "Configuring an Input/output Adapter," which is incorporated by reference herein in its entirety for all purposes.

II. FIELD OF THE DISCLOSURE

The present disclosure relates generally to configuring an input/output adapter.

III. BACKGROUND

In a virtualized system, a single peripheral component interconnect express (PCIe) hardware device may appear as multiple PCIe virtual devices that are each capable of providing virtual functions. Multiple logical partitions in the virtualized system may have access to one or more of the multiple PCIe virtual devices.

When an input/output (I/O) adapter is plugged into a PCIe slot on a computer motherboard, the maximum number of virtual functions that are available for use may vary based on various factors, such as the design of the card, the manufacturer of the card, and the PCIe slot into which the I/O adapter is plugged. For example, the capabilities of the PCIe slot into which the I/O adapter is plugged may affect the maximum number of available virtual functions. In addition, the maximum number of virtual functions associated with each port of the I/O adapter may be set when the virtualized system is initialized. The virtualized system may be reinitialized to reconfigure the maximum number of virtual functions associated with each port of the I/O adapter.

IV. SUMMARY

In a particular embodiment, a computer-implemented method includes initializing a driver associated with an input/output adapter in response to receiving an initialize driver request from a client application. The computer-implemented method includes initializing the input/output adapter to enable adapter capabilities of the input/output adapter to be determined. The computer-implemented method also includes determining the adapter capabilities of the input/output adapter. The computer-implemented method further includes determining slot capabilities of a slot associated with the input/output adapter. The computer-implemented method also includes setting configurable capabilities of the input/output adapter based on the adapter capabilities and the slot capabilities.

In another particular embodiment, a computer program product includes a non-transitory computer usable medium having computer usable program code embodied therewith. The computer usable program code is executable by a processor to initialize a driver associated with an input/output adapter in response to receiving an initialize driver request from a client application. The computer usable program code is executable by the processor to initialize the input/output adapter to enable adapter capabilities of the input/output adapter to be determined. The computer usable program code is further executable by a processor to determine the adapter capabilities of the input/output adapter. The computer usable program code is also executable by a processor to determine slot capabilities of a slot associated with the input/output adapter. The computer usable program code is executable by a processor to set configurable capabilities of the input/output adapter based on the adapter capabilities and the slot capabilities. The configurable capabilities include a maximum number of virtual functions associated with the input/output adapter and a maximum number of virtual functions associated with each port of the input/output adapter.

In another particular embodiment, a system includes an adapter abstraction layer comprising computer usable program code that is stored at a non-transitory computer usable medium. The adapter abstraction layer is executable by the processor to initialize a driver associated with an input/output adapter in response to receiving an initialize driver request from a client application. The adapter abstraction layer is executable by the processor to initialize the input/output adapter to enable adapter capabilities of the input/output adapter to be determined. The adapter abstraction layer is further executable by the processor to determine the adapter capabilities of the input/output adapter. The adapter abstraction layer is also executable by the processor to determine slot capabilities of a slot associated with the input/output adapter. The adapter abstraction layer is executable by the processor to set configurable capabilities of the input/output adapter based on the adapter capabilities and the slot capabilities. The configurable capabilities include a maximum number of virtual functions associated with the input/output adapter, a maximum number of virtual functions associated with each port of the input/output adapter, a maximum number of queues assigned to each virtual function, a maximum number of interrupts assigned to each virtual function, another parameter associated with the virtual functions, or any combination thereof.

These and other advantages and features that characterize embodiments of the disclosure are set forth in the claims listed below. However, for a better understanding of the disclosure, and of the advantages and objectives attained through its use, reference should be made to the drawings and to the accompanying descriptive matter in which there are described exemplary embodiments of the disclosure.

V. BRIEF DESCRIPTION OF THE DRAWINGS

VI. DETAILED DESCRIPTION

Figure 1:
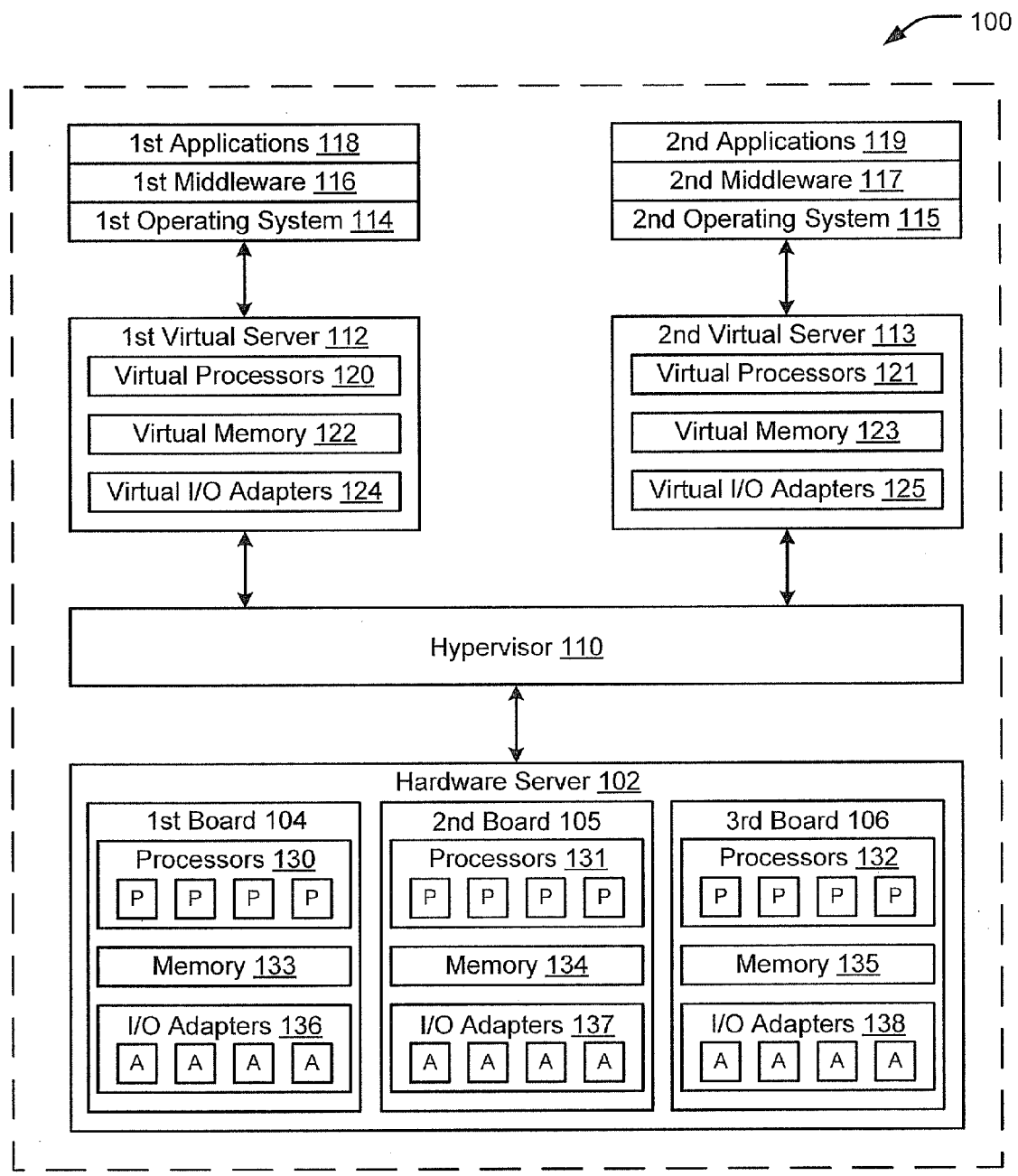
FIG. 1 is a block diagram of a first embodiment of a system to configure an input/output adapter.

Referring to FIG. 1, a block diagram of a first embodiment of a system that includes a dynamically configurable input/output adapter is depicted and generally designated 100. The system 100 may include a hardware server 102 that is managed by a hypervisor 110. The hardware server 102 may include hardware resources, such as a first board 104, a second board 105, and a third board 106. While three boards are illustrated in FIG. 1, the number of boards may be increased or decreased based on processing considerations. The boards 104-106 may include processors 130-132, memory 133-135, and input/output (I/O) adapters 136-138. Each of the boards 104-106 may include additional hardware resources (not shown), such as specialized processors (e.g., digital signal processors, graphics processors, etc.), disk drivers, other types of hardware, or any combination thereof. The processors 130-132, the memory 133-135, and the I/O adapters 136-138 of the hardware server 102 may be managed by hypervisor 110. Each processor of the processors 130-132 may be a simultaneous multithreading (SMT)-capable processor that is capable of concurrently executing multiple different threads.

The hypervisor 110 may create and manage logical partitions (LPARs), such as virtual servers 112, 113. A logical partition may be a subset of the resources of the hardware server 102 that is virtualized as a separate virtual server. Each of the virtual servers 112, 113 may have its own set of virtual resources, similar to a physical server. For example, the first virtual server 112 may include virtual processors 120, virtual memory 122, and virtual I/O adapters 124. Virtual server 113 may include virtual processors 121, virtual memory 123, and virtual I/O adapters 125. The hypervisor 110 may map the virtual servers 112, 113 to the hardware of the hardware server 102. For example, the virtual processors 120, 121 may be mapped to the processors 130-132; the virtual memory 122, 123 may be mapped to memory 133-135, and the virtual I/O adapters 124-125 may be mapped to the I/O adapters 136-138. The hypervisor 110 may manage the selection of portions of the hardware server 102 and their temporary assignment to portions of the virtual servers 112, 113.

In the system 100, a particular I/O adapter of the I/O adapters 136-138 may be virtually divided to enable the particular I/O adapter to be used by more than one virtual server. For example, the virtual servers 112, 113 may both use a particular I/O adapter of the I/O adapters 136-138. Virtual functions of each I/O adapter of the I/O adapters 136-138 may be dynamically assigned and reassigned without having to create a new logical partition.

Figure 2:
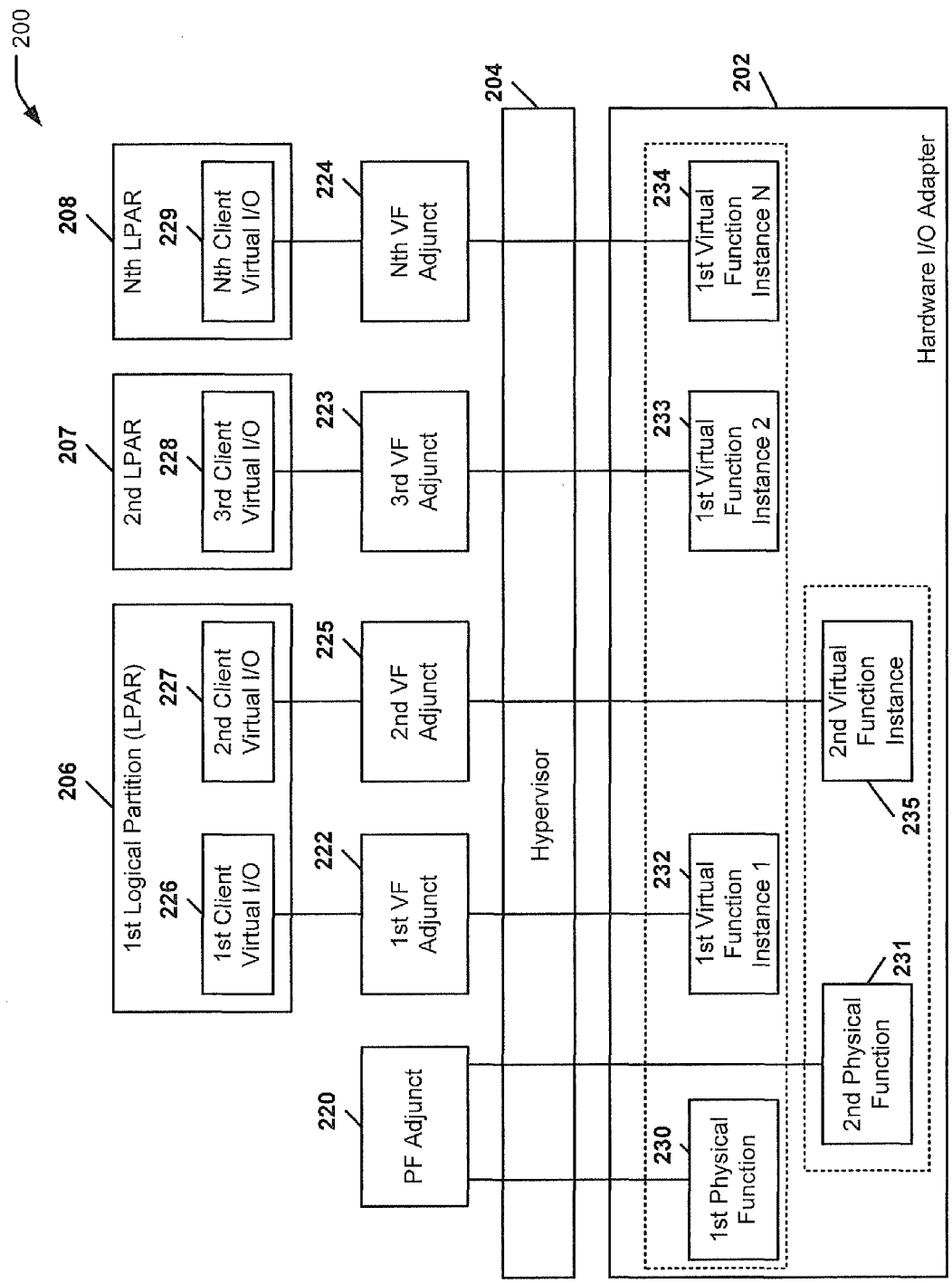
FIG. 2 is a block diagram of a second embodiment of a system to configure an input/output adapter.

Referring to FIG. 2, a block diagram of a second embodiment of a system that includes a dynamically configurable input/output (I/O) adapter is depicted and generally designated 200. In the system 200, a hypervisor 204 may enable multiple logical partitions to access virtual functions provided by hardware that includes a hardware I/O adapter 202. For example, the hypervisor 204 may enable a first logical partition 206, a second logical partition 207, and an Nth logical partition 208, to access virtual functions 232-235 that are provided by the hardware I/O adapter 202. To illustrate, the hypervisor 204 may use a first physical function 230 of the hardware I/O adapter 202 to provide a first instance of a first virtual function 232, a second instance of a first virtual function 233, and an Nth instance of a first virtual function 234 to the logical partitions 206-208. The hypervisor 204 may use a second physical function 231 of the hardware I/O adapter 202 to provide a second virtual function 235 to the logical partitions 206-208.

The physical functions 230, 231 may include peripheral component interconnect (PCI) functions that support single root I/O virtualization capabilities (SR-IOV). Each of the virtual functions 232-235 may be associated with one of the physical functions 230, 231 and may share one or more physical resources of the hardware I/O adapter 202.

Software module adjuncts, such as a physical function (PF) adjunct 220 and virtual function (VF) adjuncts 222-225, may assist the hypervisor in managing the physical functions 230, 231 and the virtual functions 232-235. For example, a user may specify a particular configuration and the PF adjunct 220 may configure the virtual functions 232-235 from the physical functions 230-231 accordingly. The VF adjuncts 222-225 may function as virtual device drivers. For example, just as a device driver for a physical device may enable a client application to access the functions of the device, each of the VF adjuncts 222-225 may enable a client application to access the virtual functions 232-235. In the system 200, the VF adjuncts 222 and 224-225 may enable access to the first virtual function instances 232 and 234-235, and the second VF adjunct 225 may enable access to the second virtual function 235.

In operation, the PF adjunct 220 may enable the first virtual function instances 232-234 from the first physical function 230. The PF adjunct 220 may enable the second virtual function 235 from the second physical function 231. The virtual functions 232-235 may be enabled based on a user provided configuration. Each of the logical partitions 206-208 may execute an operating system (not shown) and client applications (not shown). The client applications that execute at the logical partitions 206-208 may perform virtual input/output operations. For example, a first client application executing at the first logical partition 206 may include first client virtual I/O 226, and a second client application executing at the first logical partition 206 may include a second client virtual I/O 227. The first client virtual I/O 226 may access the first instance of the first virtual function 232 via the first VF adjunct 222. The second client virtual I/O 227 may access the second virtual function 235 via the second VF adjunct 225. A third client virtual I/O 228 executing at the second logical partition 207 may access the second instance of the first virtual function 233 via the third VF adjunct 223. An Nth client virtual I/O 229 executing at the Nth logical partition 208 may access the Nth instance of the first virtual function 233 via the Nth VF adjunct 224.

Thus, the hypervisor 204 may enable the client virtual I/Os 226-229 to access the virtual functions 232-235 that are associated with the physical functions 230, 231 of the hardware I/O adapter 202. The virtual functions 232-235 of the hardware I/O adapter 202 may be dynamically assigned, as described below, without having to remove and recreate the logical partitions 206-208.

Figure 3:
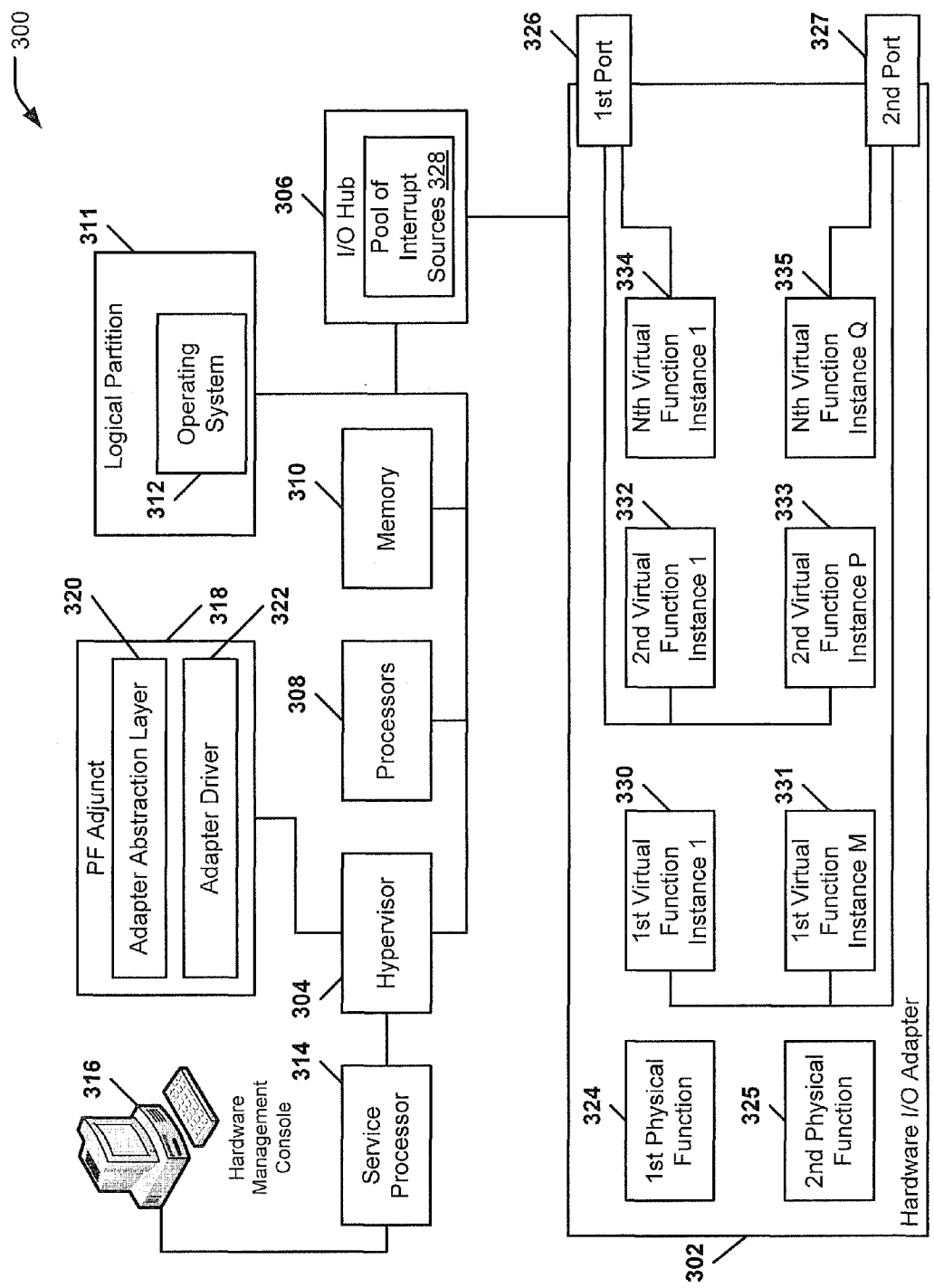
FIG. 3 is a block diagram of a third embodiment of a system to configure an input/output adapter.

Referring to FIG. 3, a block diagram of a third embodiment of a system that includes a dynamically configurable input/output (I/O) adapter is depicted and generally designated 300. In the system 300, a hypervisor 304 may be coupled to hardware devices, such as a hardware I/O adapter 302, an I/O hub 306, processors 308, and memory 310. The hypervisor 304 may be coupled to an operating system 312 executing to a logical partition 311 that executes an operating system 312. The hypervisor 304 may enable the logical partition 311 to access virtual functions associated with the hardware I/O adapter 302. A physical function (PF) adjunct 318 may be coupled to the hypervisor 304 to manage the physical functions of the hardware I/O adapter 302. A hardware management console 316 may be coupled to the hypervisor 304 via a service processor 314.

The service processor 314 may be a micro-controller that is embedded in a hardware server (e.g., the hardware server 102 of FIG. 1) to enable remote monitoring and management of the hardware server via the hardware management console 316. For example, the hardware management console 316 may be used by a system administrator to specify a configuration of hardware devices, such as specifying virtual functions of the hardware I/O adapter 302. The PF adjunct 318 may configure virtual functions of the hardware I/O adapter 302 based on configuration information provided by a system administrator via the hardware management console 316.

The hypervisor 304 may enable hardware devices, such as the hardware I/O adapter 302, to be logically divided into virtual resources and accessed by one or more logical partitions (e.g., the N logical partitions 206-208 of FIG. 2). The I/O hub 306 may include a pool of interrupt sources 328. The hypervisor 304 may associate at least one interrupt source from the pool of interrupt sources 328 with each virtual function of the hardware I/O adapter 302.

The processors 308 may include one more processors, such as central processing units (CPUs), digital signal processors (DSPs), other types of processors, or any combination thereof. One or more of the processors 308 may be configured in a symmetric multiprocessor (SMP) configuration.

The memory 310 may include various types of memory storage devices, such as random access memory (RAM) and disk storage devices. The memory 310 may be used to store and retrieve various types of data. For example, the memory 310 may be used to store and to retrieve operational instructions that are executable by one or more of the processors 308.

The operating system 312 may execute within the logical partition 311. The virtual I/O of client applications (e.g., the client virtual I/Os 226-229 of FIG. 2) that execute using the operating system 312 may access virtual functions of the hardware I/O adapter 302. The hypervisor 304 may use the I/O hub 306 to connect to and control I/O devices, such as the hardware I/O adapter 302.

The PF adjunct 318 may include an adapter abstraction layer 320 and an adapter driver 322. The adapter abstraction layer 320 may include a "generic" abstraction to enable configuration of physical functions and virtual functions of the hardware I/O adapter 302. The adapter driver 322 may be specific to each particular model of hardware adapter. The adapter driver 322 may be provided by a manufacturer of the hardware I/O adapter 302.

The hardware I/O adapter 302 may include physical functions and ports, such as a first physical function 324, a second physical function 325, a first port 326, and a second port 327. The PF adjunct 318 may configure virtual functions based on the physical functions 324-325 and associate the virtual functions with one or more of the ports 326, 327 of the hardware I/O adapter 302. For example, the PF adjunct 318 may configure the first physical function 324 to host multiple instances of a first virtual function, such as the first instance of the first virtual function 330 and the Mth instance of the first virtual function 331, where M>1. The instances of the first virtual function 330, 331 may be associated with the second port 327. The PF adjunct 318 may configure the second physical function 325 to host multiple instances of a second virtual function, such as the first instance of the second virtual function 332 and the Pth instance of the second virtual function 333, where P>1. The instances of the second virtual function 332, 333 may be associated with the first port 326. The PF adjunct 318 may configure multiple instances of an Nth virtual function, such as the first instance of the Nth virtual function 334 and the Qth instance of the Nth virtual function 335, where N>2 and Q>1. The instances of the Nth virtual function 334, 335 may be associated with the second port 327. The instances of the Nth virtual function 334, 335 may be hosted by a physical function, such as one of the first physical function 324, the second physical function 325, and another physical function (not shown).

The hypervisor 304 may thus enable access to the virtual functions 330-335 that are associated with the physical functions 324-325 of the hardware I/O adapter 302. The virtual functions 330-335 of the hardware I/O adapter 302 may be dynamically assigned, as described below.

Figure 4:
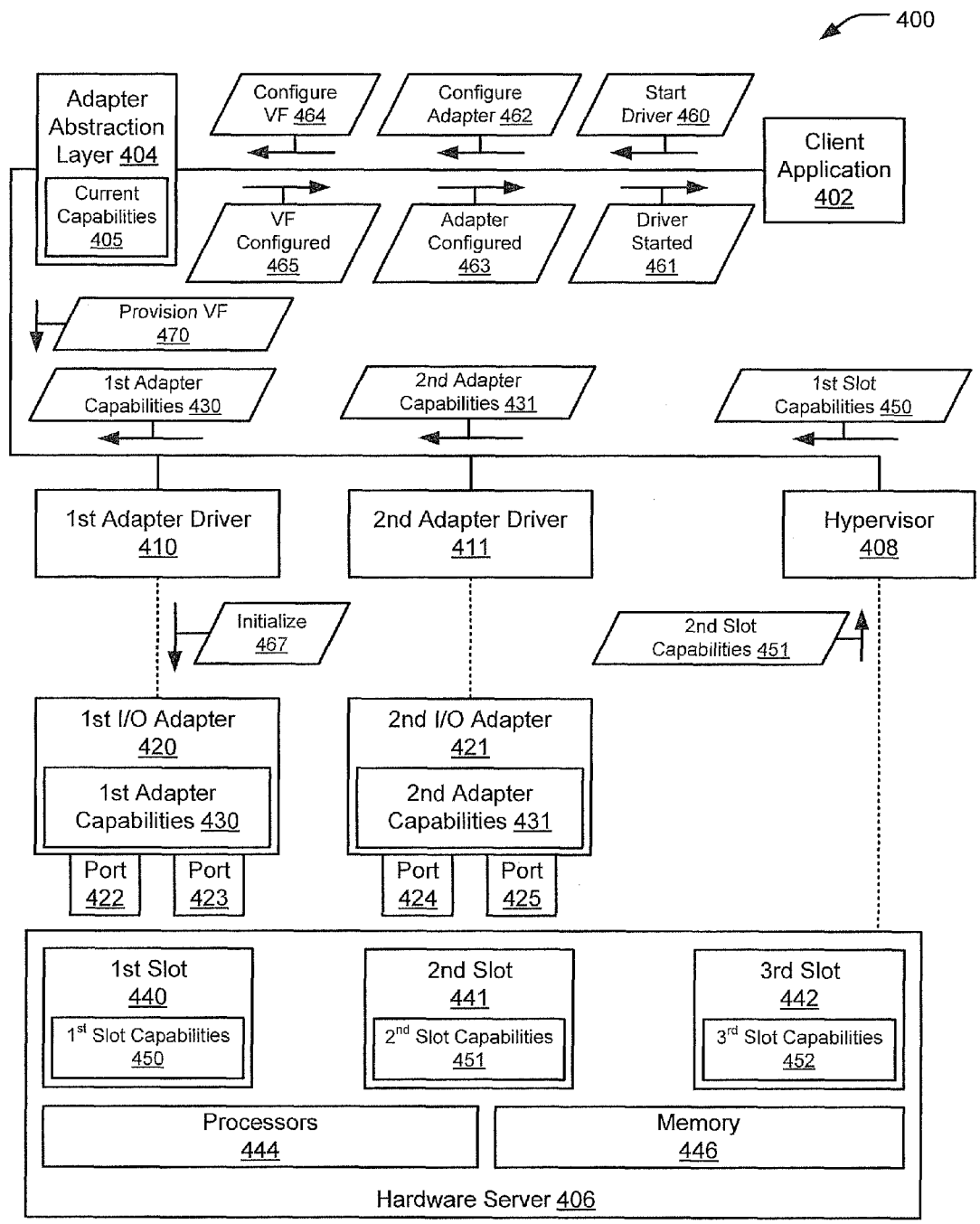
FIG. 4 is a block diagram of a fourth embodiment of a system to configure an input/output adapter.

Referring to FIG. 4, a block diagram of a fourth embodiment of a system that includes a dynamically configurable input/output (I/O) adapter is depicted and generally designated 400. The system 400 includes an adapter abstraction layer 404 that is communicatively coupled to a client application 402, a first adapter driver 410, a second adapter driver 411, and a hypervisor 408. The first adapter driver 410 may be associated with a first I/O adapter 420 and the second adapter driver 411 may be associated with a second I/O adapter 421. The first I/O adapter 420 may be associated with (e.g., plugged into) a first slot 440 of a hardware server 406, and the second I/O adapter 421 may be associated with (e.g., plugged into) a second slot 441 of the hardware server 406.

The client application 402 may execute within a logical partition (e.g., one of the logical partitions 206-208 of FIG. 2, the logical partition 311 of FIG. 3, and the hardware management console 316 of FIG. 3). Prior to utilizing an I/O adapter (e.g., one of the I/O adapters 420, 421), the client application 402 may initialize and configure the I/O adapter.

The adapter abstraction layer 404 may enable the client application 402 to configure the I/O adapters 420-421 using generic, i.e., non-adapter specific commands. For example, the client application 402 may use a particular set of commands to configure multiple I/O adapters, without regard to the specific capabilities of each of the multiple I/O adapters. To illustrate, the client application 402 may use a particular set of commands to configure both the first I/O adapter 420 and the second I/O adapter 421 when the first I/O adapter 420 is manufactured by a first manufacturer, the second I/O adapter 421 is manufactured by a second manufacturer, and the first I/O adapter 420 has first adapter capabilities 430 that are different from second adapter capabilities 431 of the second I/O adapter 421. Each instance of the adapter abstraction layer 404 may be capable of managing one or more I/O adapters. For example, in FIG. 4, the adapter abstraction layer 404 may manage the I/O adapters 420-421.

The first I/O adapter 420 may include multiple ports, such as a port 422 and a port 423. The second I/O adapter 421 may include multiple ports, such as a port 424 and a port 425. The I/O adapters 420, 421 may provide virtual functions (e.g., the virtual functions 330-335 of FIG. 3) via the ports 422-425.

The hardware server 406 may include multiple slots, such as the first slot 440, the second slot 441, and a third slot 442. In a particular embodiment, the slots 440-442 may be PCIe compatible slots that are capable of accommodating PCIe cards. A hardware card, such as one of the I/O adapters 420, 421, may provide various functions when the hardware card is plugged into one of the slots 440-442 of the hardware server. The hardware server 406 may include processors 444 and memory 446. The processors 444 may include one more processors, such as central processing units (CPUs), digital signal processors (DSPs), other types of processors, or any combination thereof. One or more of the processors 444 may be configured in a symmetric multiprocessor (SMP) configuration. The memory 446 may include various types of memory storage devices, such as random access memory (RAM) and disk storage devices. The memory 446 may be used to store and retrieve various types of data, such as operational instructions that are executable by one or more of the processors 444.

In operation, the first I/O adapter 420 may be plugged into the first slot 440, and the second I/O adapter 421 may be plugged into the second slot 441. Prior to utilizing the first I/O adapter 420, the client application 402 may send a start driver 460 request to the adapter abstraction layer 404. The adapter abstraction layer 404 may initialize the first adapter driver 410 and may send a driver started 461 message to the client application 402. The first adapter driver 410 may send an initialize request 467 to the first I/O adapter 420. The first adapter driver 410 may initialize the first I/O adapter 420 up to a point where the first adapter capabilities 430 may be determined.

The first adapter driver 410 may determine the first adapter capabilities 430 of the first I/O adapter 420 and send the first adapter capabilities 430 to the adapter abstraction layer 404. For example, the first adapter capabilities 430 may be determined using an identifier associated with the first I/O adapter 420 (e.g., the identifier may be used in a lookup table to determine the first adapter capabilities 430), reading capability registers associated with the first I/O adapter 420, reading a portion of a memory of the first I/O adapter 420 that includes the first adapter capabilities 430, using adapter-specific protocols/commands to directly query a firmware of the first I/O adapter 420, or any combination thereof.

The adapter capabilities 430, 431 may include a type of each of the I/O adapters 420, 421 (e.g., network interface card, fiber channel card, fiber channel over Ethernet card etc.), a maximum number of virtual functions supported by each of the I/O adapters 420, 421, a number of ports associated with each of the I/O adapters 420, 421, a maximum number of virtual functions supported on each port of each of the I/O adapters 420, 421, a maximum number of promiscuous mode virtual functions that are supported on each port of each of the I/O adapters 420, 421, a maximum number of diagnostic mode virtual functions that are supported on each port of each of the I/O adapters 420, 421, physical capabilities of each port of each of the I/O adapters 420, 421 (e.g., a maximum port speed, supported duplex modes, and supported loopback capabilities), other capabilities, or any combination thereof. When a promiscuous mode virtual function is enabled for a particular port (e.g., one of the ports 422-425), the promiscuous mode virtual function may pass through any traffic that is received at the port rather than just traffic that is addressed to that particular port.

The adapter abstraction layer 404 may determine capabilities of a slot (e.g., the first slot capabilities 450 of the first slot 440) that is associated with the first I/O adapter 420. For example, the adapter abstraction layer 404 may receive the first slot capabilities 450 of the first slot 440 from the hypervisor 408 in response to sending a query to the hypervisor 408 (e.g., via a hypervisor call). The slot capabilities 450-452 may include a maximum number of physical functions supported by each of the slots 440-442, an amount of memory-mapped input/output (MMIO) space available for each physical function, an amount of MMIO space available for virtual functions associated with each physical function, a maximum number of virtual functions of a particular type (e.g., network interface card, fiber channel card, fiber channel over Ethernet card etc.) that are supported by each of the slots 440-442, a number of message signaled interrupt sources that are available for virtual functions, other slot capabilities, or any combination thereof.

The adapter abstraction layer 404 may determine current capabilities 405 of the first I/O adapter 420 in the first slot 440 based on the first adapter capabilities 430 and the first slot capabilities 450. For example, plugging the first I/O adapter 420 into the first slot 440 may reduce an availability of the first adapter capabilities 430. The adapter abstraction layer 404 may determine the current capabilities 405 of the first I/O adapter 420 in the first slot 440, such as a maximum number of virtual functions that may be configured for the first I/O adapter 420, a maximum number of virtual functions that may be configured for each of the ports 422, 423 of the first I/O adapter 420, a maximum number of port virtual functions that may be used in promiscuous or diagnostic mode, other capabilities, or any combination thereof.

The client application 402 may initiate configuring the first I/O adapter 420 by sending a configure adapter message 462 to the adapter abstraction layer 404. The adapter abstraction layer 404 may configure the first I/O adapter 420 based on the current capabilities 405 associated with the first I/O adapter 420 and based on information contained in the configure adapter message 462. For example, the configure adapter message 462 may indicate a maximum of ten virtual functions for the first I/O adapter 420 and a maximum of five virtual functions available for each of the ports 422 and 423. The adapter abstraction layer 404 may configure a maximum of eight virtual functions for the first I/O adapter 420 and a maximum of four virtual functions available for each of the ports 422 and 423 based on the current capabilities 405 when the current capabilities 405 are less than those specified by the client application 402. The adapter abstraction layer may determine a number of interrupt sources (e.g., from the pool of interrupt sources 328 of FIG. 3) to be associated with each virtual function (e.g., the virtual functions 330-335) to enable each virtual function to be associated with at least one interrupt source.

The adapter abstraction layer 404 may configure the first I/O adapter 420 by instructing the first adapter driver 410 to configure the first I/O adapter 420 based on the current capabilities 405 and based on the configure adapter 462 message. The first adapter driver 410 may perform model specific configuration of the first I/O adapter 420. The first adapter driver 410 may allocate and configure physical functions of the first I/O adapter 420 to enable configuration of the virtual functions of the first I/O adapter 420. The first adapter driver 410 may allocate and configure the physical functions of the first I/O adapter 420 based on the current capabilities 405 and based on the configure adapter message 462. For example, the first adapter driver 410 may determine a maximum number of virtual functions that may be configured for each physical function of the first I/O adapter 420. After the first I/O adapter 420 has been configured, the adapter abstraction layer 404 may send an adapter configured message 463 to inform the client application 402 that the first I/O adapter 420 has been configured.

At this point, the physical functions of the first I/O adapter 420 may have been configured, and the virtual functions of the first I/O adapter 420 may be configurable. The client application 402 may send a configure virtual functions message 464 to the adapter abstraction layer 404 to configure a virtual function of the first I/O adapter 420. For example, the configure virtual functions message 464 may request the adapter abstraction layer 404 to "configure virtual function X on port Y". The adapter abstraction layer 404 may instruct the first adapter driver 410 to configure one of the virtual functions of the first I/O adapter 420 by specifying a physical port number of the first I/O adapter 420, the virtual function to be configured, virtual function parameters, or any combination thereof. The first adapter driver 410 may associate a virtual function with a previously configured physical function and configure the virtual function based on the virtual function parameters. The first adapter driver 410 may select which particular virtual function is associated with which particular physical function based on resource utilization of the first I/O adapter 420, based on maximizing performance of the virtual function, based on maximizing performance of the physical function, based on another factor, or any combination thereof.

After the first adapter driver 410 has configured one of the virtual functions of the first I/O adapter 420, the adapter abstraction layer 404 may determine whether a mapping of the virtual function to the physical function is unique. The adapter abstraction layer 404 may store the mapping of the virtual function to the physical function. The adapter abstraction layer 404 may determine an address of the virtual function in a configuration space of the first I/O adapter 420. The adapter abstraction layer 404 may send information associated with the virtual function (e.g., a physical function number and a virtual function number associated with the virtual function, the configuration space address associated with the virtual function, and a number of interrupt sources associated with the virtual function) to the hypervisor 408. The hypervisor 408 may reserve interrupt sources for the virtual function and provide interrupt resources and configuration space to a virtual function driver (e.g., one of the VF adjuncts 222-224 of FIG. 2).

The adapter abstraction layer 404 may instruct the first adapter driver 410 to provision one of the virtual functions of the first I/O Adapter 420 via a provision VF message 470. For example, the adapter abstraction layer 404 may specify virtual function parameters based on the client application 402 and may instruct the first adapter driver 410 to provision the newly configured virtual function using the specified virtual function parameters. For example, the client application 402 may instruct the first adapter driver 410 to provision the newly configured virtual function using a particular quality of service parameter. The first adapter driver 410 may dynamically modify adapter-specific parameters at an adapter level or at a port level for the first I/O adapter 420 to specify a particular quality of service level, to reduce physical resource (e.g., ports, memory, processors) utilization, to increase throughput, to increase performance, or any combination thereof.

After the virtual function has been configured and provisioned, the adapter abstraction layer 404 may send a VF configured message 465 to the client application 402, indicating that the virtual function is available to the client application 402. When the second I/O adapter 421 is plugged into the second slot 441, the adapter abstraction layer 404 may determine the current capabilities 405 of the second I/O adapter 421 based on second adapter capabilities 431 and second slot capabilities 451. In this way, the client application 402 may configure up to a maximum number of virtual functions that the second I/O adapter 421 is capable of providing while plugged into the second slot 441.

The I/O adapters 420-421 may be re-initialized prior to reconfiguring a maximum number of virtual functions that are configurable for each of the I/O adapters 420, 421, prior to reconfiguring a maximum number of virtual functions for each of the ports 422-425, and prior to reconfiguring a maximum number of virtual functions for each of the ports 422-425 that may be used in promiscuous or diagnostic mode. The maximum number of virtual functions for each of the I/O adapters 420, 421, the maximum number of virtual functions for each of the ports 422-425, and the maximum number of virtual functions for each of the ports 422-425 that may be used in promiscuous or diagnostic mode may be collectively referred to as "the maximums". When setting up the maximums, the adapter drivers 410, 411 may allocate internal static resources (e.g., queues, tables, internal memory, etc.) of the I/O adapters 420, 421 among the virtual functions. These static resources may be resources of the I/O adapters 420, 421 that cannot be shifted between virtual functions when one or more of the virtual functions are active. Thus, the virtual functions of a particular I/O adapter may be inactive prior to reconfiguring the maximums because the I/O adapter may be reinitialized to reallocate the adapter's static internal resources.

The adapter abstraction layer 404 may dynamically, without re-initializing the adapter drivers 410, 411, configure operational settings of the virtual functions associated with each of the I/O adapters 420, 421, such as quality of service parameters, minimum/maximum bandwidth-related parameters, latency-related parameters, a promiscuous or diagnostic mode of each virtual function, physical parameters of the virtual functions (e.g., a media access control address for a network interface card virtual function), other operational settings, or any combination thereof.

For example, the first I/O adapter 420 adapter in the first slot 440 may support a maximum of forty virtual functions. Each of the ports 422, 423 nay also support a maximum of forty virtual functions (i.e. all forty of the virtual functions may be associated with a single port). A user may configure the first I/O adapter to use twenty-four virtual functions, with twelve virtual functions for each of the ports 422, 423, and with one diagnostic mode capable virtual function for each of the ports 422, 423. The user may configure a first virtual function in a diagnostic mode for the port 422 and a second virtual function in a diagnostic mode for the port 423. The first virtual function and the second virtual function may be assigned to a particular logical partition to run diagnostics. Once the diagnostics are complete, the user may de-configure the two virtual functions used to run diagnostics and configure the twelve normal (non-diagnostic) mode virtual functions on the first port 422 and assign them to twelve different logical partitions. The user may provision different quality of service settings for each of those twelve virtual functions based on each logical partition's needs. The user may configure twelve more virtual functions on the second port 423 (e.g., for redundancy/backup to the twelve virtual functions on the first port 422) and assign them to each of the twelve logical partitions. At this point, the maximum of twenty-four total virtual functions for the first I/O adapter, and the maximum of twelve virtual functions for each of the ports 422, 423 have been met, so in order to get more virtual functions to configure, the twenty-four currently configured virtual functions may be de-configured to enable the adapter to be reinitialized to reestablish the maximums.

By determining the adapter capabilities 430, 431 and the slot capabilities 450, 451 and using them to configure the physical functions and virtual functions of the I/O adapters 420, 421, the adapter abstraction layer 404 may prevent the client application 402 from attempting to configure more than the maximum number of virtual functions that the second I/O adapter 421 is capable of providing while plugged into the second slot 441. In addition, the adapter abstraction layer 404 may dynamically reconfigure the physical functions and the virtual functions of the I/O adapters 420, 421 to enable a particular quality of service level, to reduce physical resource utilization, to increase throughput, to increase performance, or any combination thereof.

Figure 5:
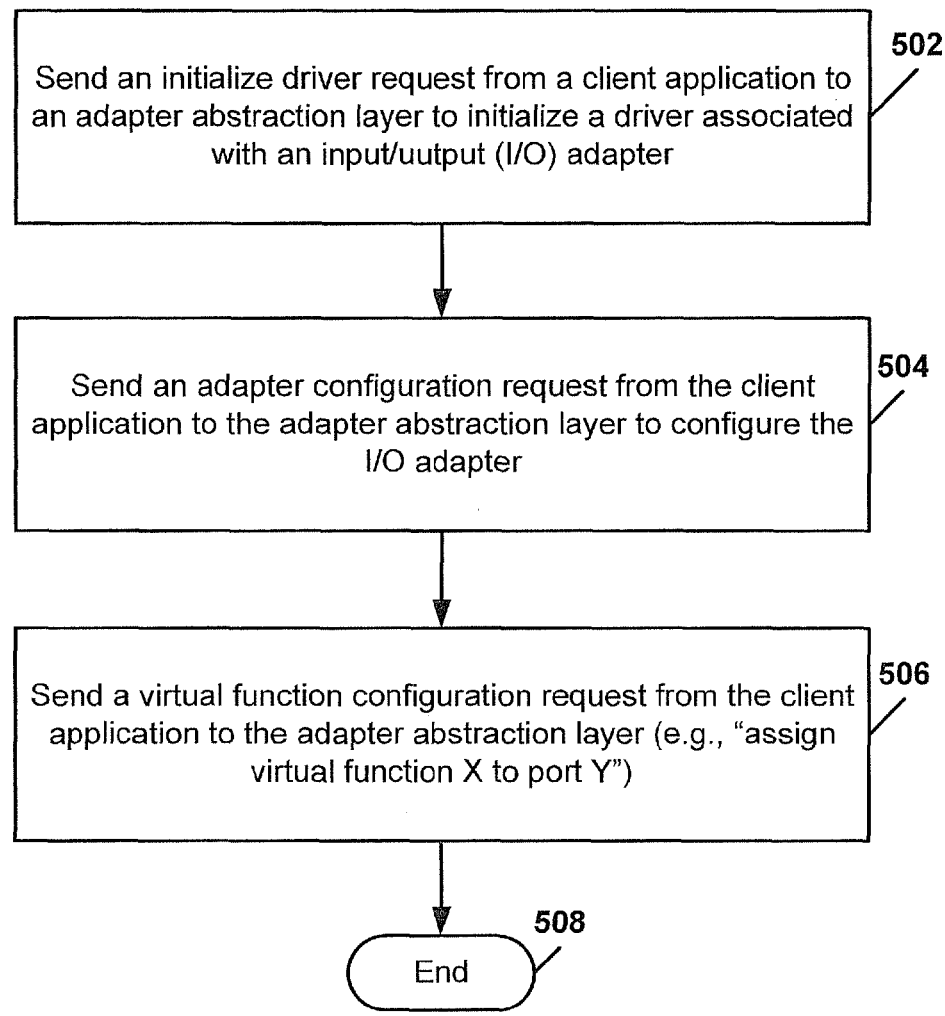
FIG. 5 is a flow diagram of a first method to configure an input/output adapter.

Referring to FIG. 5, a flow diagram of a first method to configure an input/output (I/O) adapter is depicted. An embodiment of the method may be performed by a client application, such as one of the applications 118, 119 of FIG. 1 and the client application 402 of FIG. 4. A client application may send an initialize driver request to an adapter abstraction layer. The initialize drive request may initialize a driver associated with an I/O adapter, at 502. For example, the client application 402 of FIG. 4 may send the start driver message 460 to the adapter abstraction layer 404 to initialize one of the adapter drivers 410-411.

Moving to 504, the client application may send an adapter configuration request from to the adapter abstraction layer to configure the I/O adapter (e.g., a maximum number of virtual functions for the adapter and a maximum number of virtual functions per port). For example, in FIG. 4, the client application 402 may send the configure adapter 462 message to the adapter abstraction layer 404 to configure physical functions and virtual functions of one of the I/O adapters 420, 421.

Proceeding to 506, the client application may send a virtual function configuration request to the adapter abstraction layer (e.g., "assign virtual function X to port Y"). For example, the client application 402 of FIG. 4 may send the configure VF message 464 to the adapter abstraction layer 404 to configure and provision one or more virtual functions of one of the I/O adapters 420, 421. The method may end at 508.

Figure 6:
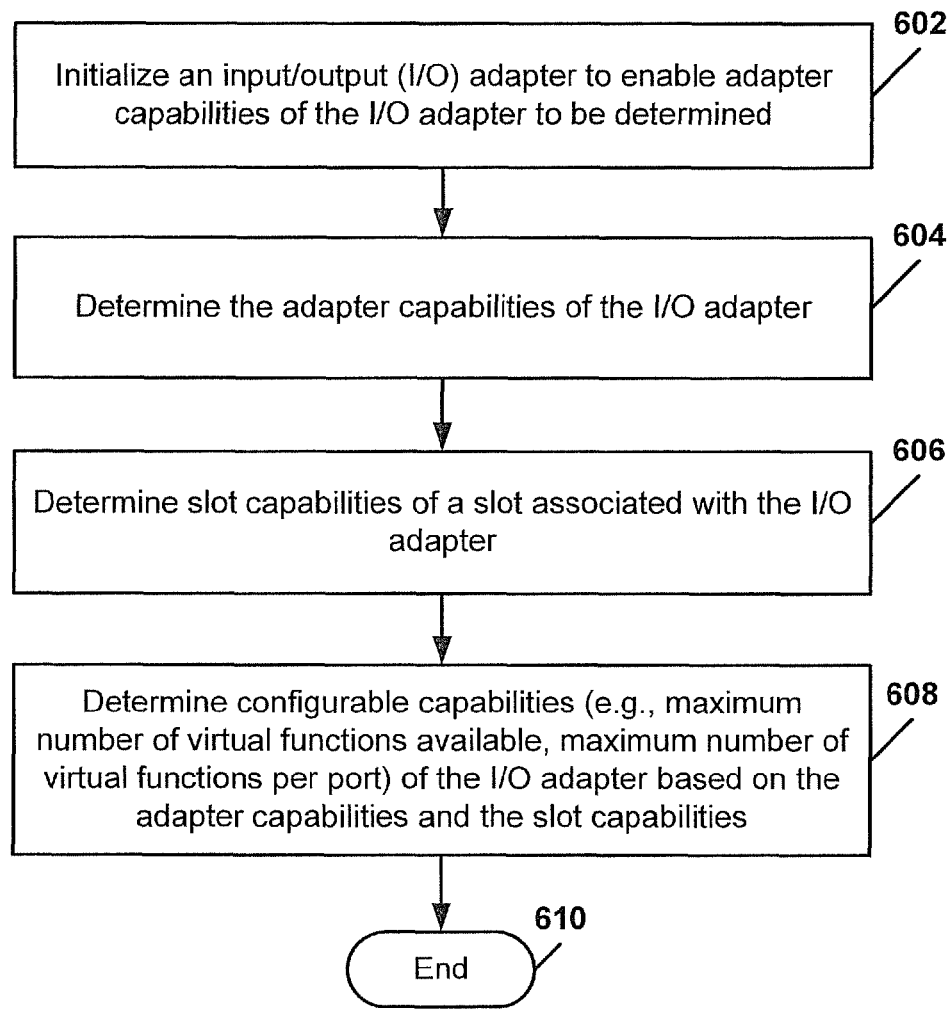
FIG. 6 is a flow diagram of a second method to configure an input/output adapter.

Referring to FIG. 6, a flow diagram of a second method to configure an input/output (I/O) adapter is depicted. An embodiment of the method may be performed by an adapter abstraction layer, such as the adapter abstraction layer 320 of FIG. 3 and the adapter abstraction layer 404 of FIG. 4. The method may be performed in response to receiving an initialize driver request (e.g., the start driver 460 message of FIG. 4) from a client application.

An I/O adapter may be initialized to enable adapter capabilities of the I/O adapter to be determined, at 602. Proceeding to 604, the adapter capabilities of the I/O adapter may be determined. For example, the adapter abstraction layer 404 may instruct one of the adapter drivers 410, 411 to initialize one of the I/O adapters 420, 421 and to determine one of the adapter capabilities 430, 431. Advancing to 606, slot capabilities of a slot associated with the I/O adapter may be determined. For example, the adapter abstraction layer 404 of FIG. 4 may determine the slot capabilities 450, 451 of the slots 440, 441 via a request to the hypervisor 408.

Proceeding to 608, configurable capabilities (e.g., maximum number of virtual functions available, maximum number of virtual functions per port) of the I/O adapter may be determined based on the adapter capabilities and the slot capabilities. For example in FIG. 4, the adapter abstraction layer 404 may determine the current capabilities 405 of the first I/O adapter 420 based on the first adapter capabilities 430 and based on the first slot capabilities 450. The method may end at 610.

Thus, physical functions and virtual functions of an I/O adapter may be configured based on the adapter capabilities of the I/O adapter and based on the slot capabilities of the slot associated with the I/O adapter. In this manner, a client application may be prevented from configuring more than the maximum capabilities of the I/O adapter, such as the maximum number of virtual functions that the I/O adapter is capable of providing and the maximum number of virtual functions that each port of the I/O adapter is capable of providing.

Figure 7:
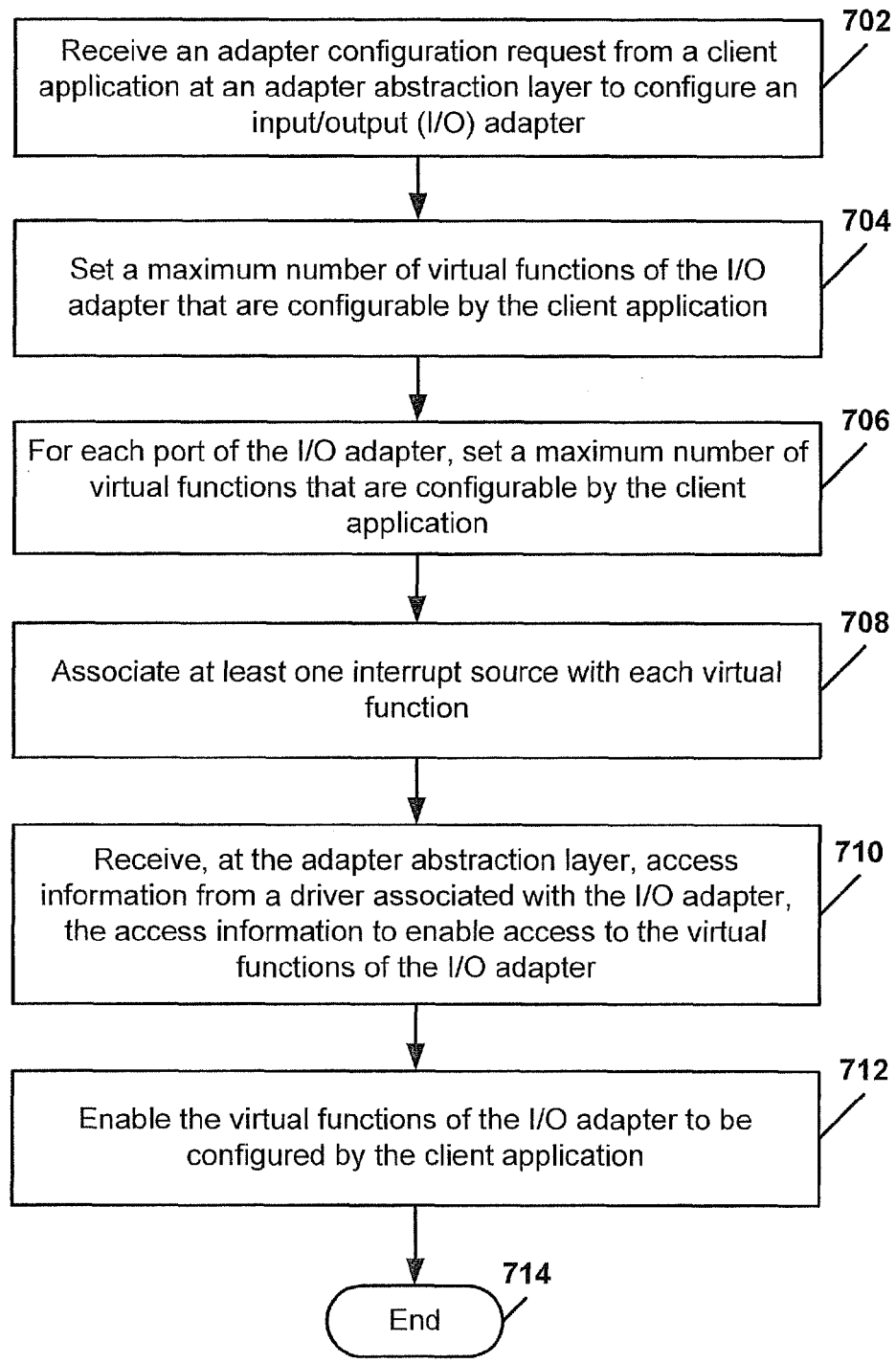
FIG. 7 is a flow diagram of a third method to configure an input/output adapter.

Referring to FIG. 7, a flow diagram of a third method to configure an input/output I/O adapter is depicted. An embodiment of the method may be performed by an adapter abstraction layer, such as the adapter abstraction layer 320 of FIG. 3 and the adapter abstraction layer 404 of FIG. 4. An adapter configuration request to configure an I/O adapter may be received from a client application at an adapter abstraction layer, at 702. For example, the adapter abstraction layer 404 of FIG. 4 may receive the configure adapter request 462 from the client application 402. Moving to 704, a maximum number of virtual functions of the I/O adapter that are configurable by the client application may be set. Advancing to 706, a maximum number of virtual functions that are configurable by the client application may be set for each port of the I/O adapter. For example, in FIG. 4, the adapter abstraction layer 404 may set a maximum number of virtual functions for each of the I/O adapters 420, 421 that are configurable by the client application 402 based on the adapter capabilities 430, 431 and based on the slot capabilities 450-451. The adapter abstraction layer 404 may set a maximum number of virtual functions for each of the ports 422-425 that are configurable by the client application 402 based on the adapter capabilities 430, 431 and based on the slot capabilities 450, 451.

Proceeding to 708, at least one interrupt source may be associated with each virtual function. For example, the adapter abstraction layer 320 of FIG. 3 may associate at least one interrupt source from the pool of interrupts sources with each of the virtual functions 330-335. Advancing to 710, access information to enable access to the virtual functions of the I/O adapter may be received from a driver associated with the I/O adapter. For example, the adapter abstraction layer may receive information associated with the physical functions of the I/O adapter and how to configure virtual functions based on the physical functions. Continuing to 712, the adapter abstraction layer may enable virtual functions of the I/O adapter to be configured by the client application, and the method may end, at 714.

Figure 8:
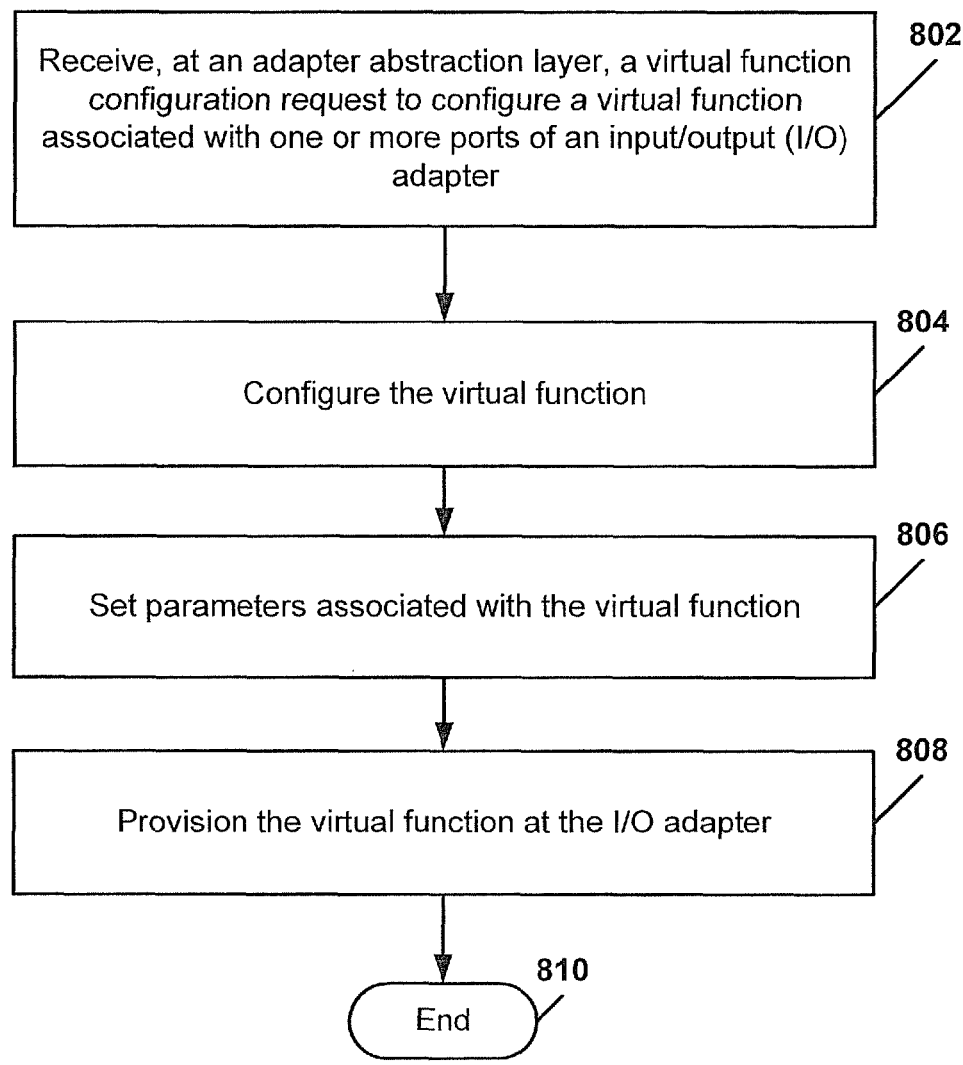
FIG. 8 is a flow diagram of a fourth method to configure an input/output adapter.

Referring to FIG. 8, a flow diagram of a fourth method to configure an input/output (I/O) adapter is depicted. An embodiment of the method may be performed by an adapter abstraction layer, such as the adapter abstraction layer 320 of FIG. 3 and the adapter abstraction layer 404 of FIG. 4. A virtual function configuration request to configure a virtual function associated with one or more ports of an Input/Output (I/O) adapter is received, at 802. For example, in FIG. 4, the adapter abstraction layer 404 may receive the configure VF message 464 from the client application 402. The virtual function may be configured, at 804. Moving to 806, parameters associated with the virtual function may be set. For example, the adapter abstraction layer 404 of FIG. 4 may configure a virtual function associated with the ports 422, 423 of the first I/O adapter 420 and set parameters associated with the virtual function. Advancing to 808, the virtual function may be provisioned at the I/O adapter, and the method may end, at 810. For example, the adapter abstraction layer 320 of FIG. 3 may instruct the adapter driver 322 to provision the first instance of the first virtual function 330.

Figure 9:
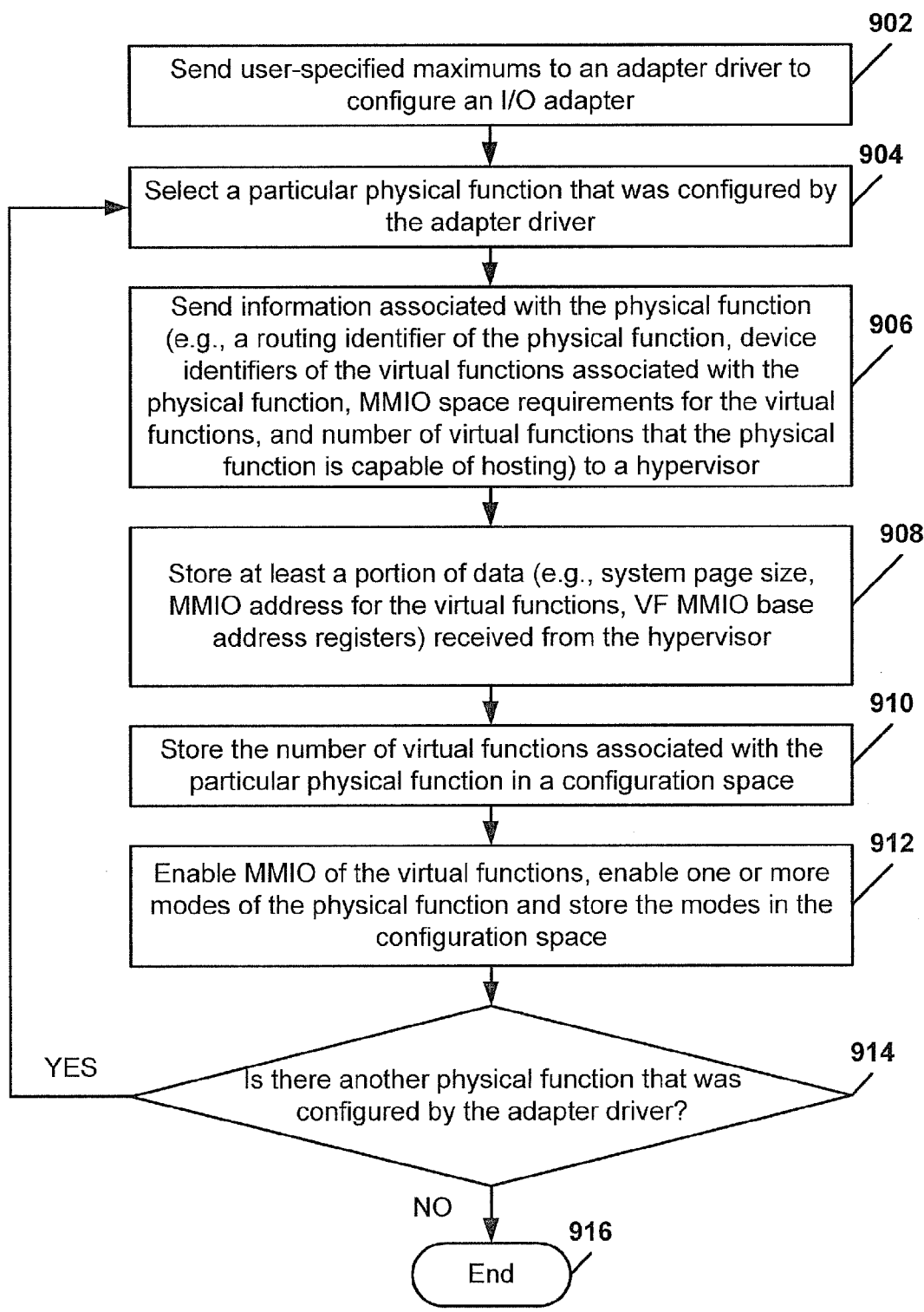
FIG. 9 is a flow diagram of a fifth method to configure an input/output adapter.

Referring to FIG. 9, a flow diagram of a fifth method to configure an input/output (I/O) adapter is depicted. An embodiment of the method may be performed by an adapter abstraction layer, such as the adapter abstraction layer 320 of FIG. 3 and the adapter abstraction layer 404 of FIG. 4. User-specified maximums (e.g., maximum virtual functions per adapter, maximum virtual functions per port, etc.) are sent to an adapter driver to configure an I/O adapter, at 902. The adapter driver may determine how many physical functions of the I/O adapter. The adapter driver may further determine a configuration of the physical functions to support the user-specified maximums. The adapter driver may distribute static resources (e.g., queues, tables, memory, etc.) that are internal to the I/O adapter to support the user-specified maximums. The adapter driver may use adapter specific registers, adapter specific commands, or any combination thereof to configure the physical functions and the virtual functions of the I/O adapter. The adapter driver may inform the adapter abstraction layer that the I/O adapter has been configured and may provide configuration information to the adapter abstraction layer. For example, the adapter driver may provide the adapter abstraction layer with addresses identifying locations of each the physical functions of the I/O adapter in a configuration space (e.g., a configuration space of a peripheral component interconnect card) and a maximum number of virtual functions that may be hosted by each physical function of the I/O adapter.

Moving to 904, the driver abstraction layer may select a particular physical function that was configured by the adapter driver and, at 906, may send information associated with the particular physical function to a hypervisor. For example, the driver abstraction layer may send a routing identifier associated with the particular physical function, device identifiers of the virtual functions that are associated with the particular physical function, memory mapped I/O (MMIO) space requirements for the virtual functions that are associated with the particular physical function, a maximum number of virtual functions that the particular physical function is capable of hosting, another parameter associated with the particular physical function, or any combination thereof. The hypervisor may map the MMIO space of the virtual functions that are hosted by the particular physical function to an address space (e.g., peripheral component interconnect address space) and send data (e.g., a system page size, MMIO addresses of the virtual functions, VF MMIO base address registers, etc.) to the driver abstraction layer.

Moving to 908, the driver abstraction layer may store at least a portion of the data that is received from the hypervisor to enable the driver abstraction layer to keep track of and configure the virtual functions. Advancing to 910, the number of virtual functions associated with the particular physical function may be stored in a configuration space. Proceeding to 912, the driver abstraction layer may enable MMIO of the virtual functions, enable one or more modes of the physical function, and store the modes in the configuration space.

Proceeding to 914, a determination may be made whether another physical function was configured by the adapter driver. When there is another physical function that was configured by the adapter driver, the method proceeds to 904. When another physical function was not configured by the adapter driver, the method may end, at 916.

Figure 10:
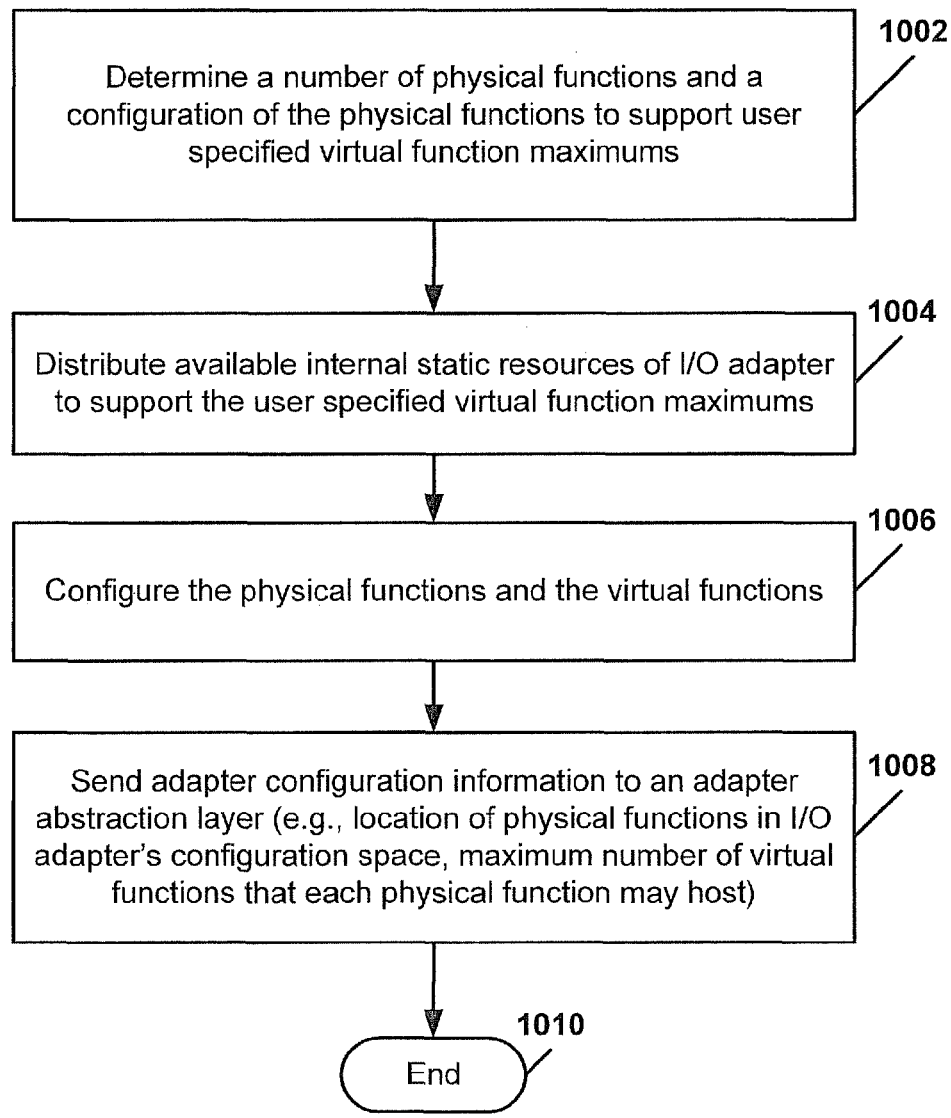
FIG. 10 is a flow diagram of a sixth method to configure an input/output adapter.

Referring to FIG. 10, a flow diagram of a sixth method to configure an input/output (I/O) adapter is depicted. An embodiment of the method may be performed by an adapter driver, such as the adapter driver 322 of FIG. 3 and the adapter drivers 410-411 of FIG. 4.

In response to receiving a request to configure an I/O adapter to support user specified virtual functions, a determination may be made at 1002 as to a number of physical functions supported by the I/O adapter. A determination may also be made as to a configuration of the physical functions to support the user specified virtual function maximums. Moving to 1004, the adapter driver may distribute available internal static resources (e.g., queues, tables, memory, etc) of the I/O adapter to support the requested virtual function maximums.

Proceeding to 1006, the adapter driver may configure the physical functions and the virtual functions of the I/O adapter to support the user specified virtual function maximums. Continuing to 1008, the adapter driver may send configuration information (e.g., location of physical functions in I/O adapter's configuration space, maximum number of virtual functions that each physical function may host) associated with the adapter to an adapter abstraction layer, and the method may end, at 1010.

Figure 11:
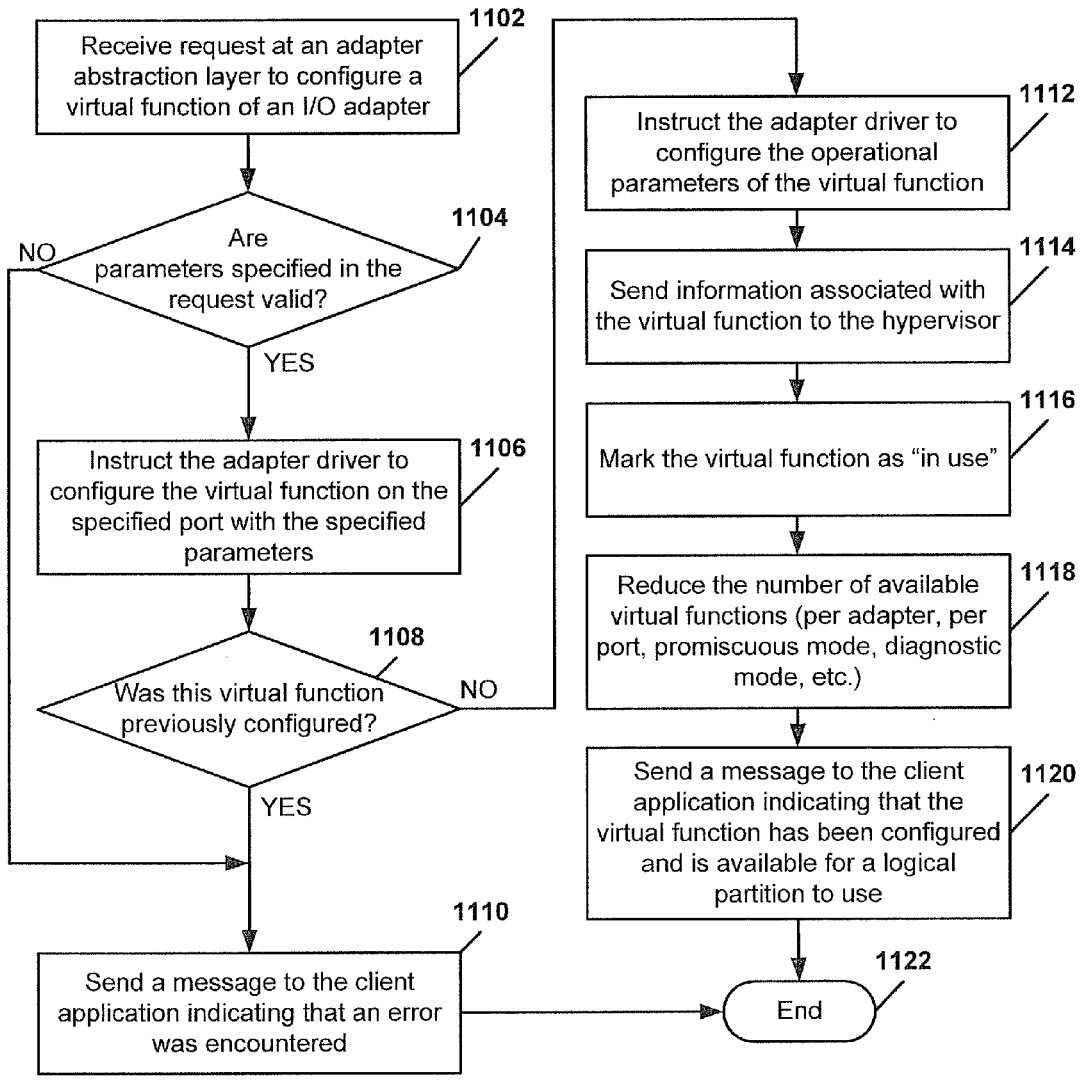
FIG. 11 is a flow diagram of a seventh method to configure an input/output adapter.

Referring to FIG. 11, a flow diagram of a seventh method to configure an input/output (I/O) adapter is depicted. An embodiment of the method may be performed by an adapter abstraction layer, such as the adapter abstraction layer 320 of FIG. 3 and the adapter abstraction layer 404 of FIG. 4.

A request to configure a virtual function of an I/O adapter may be received at an adapter abstraction layer, at 1102. The request may be received from a client application. The request may include parameters associated with the virtual function, such as a unique identifier associated with the virtual function, a port number of a port to associate with the virtual function, an identifier of a logical partition that may use the virtual function, and operational parameters associated with the virtual function (e.g., quality of service parameters, promiscuous mode parameters, and diagnostic mode parameters).

Moving to 1104, the adapter abstraction layer may determine whether the parameters associated with the virtual function are valid. For example, the adapter abstraction layer may determine whether the port number parameter is valid for the I/O adapter that is to be configured, whether the port has an available (e.g., un-configured) virtual function, whether the port has an available promiscuous or diagnostic virtual function (if applicable), whether the quality of service (QoS) settings are valid, whether the port has sufficient remaining bandwidth to support the QoS settings, or any combination thereof. When the parameters associated with the virtual function are not valid, a message may be sent to the client application indicating that an error was encountered, at 1110, and the method may end, at 1122.

When the parameters associated with the virtual function are valid, the method continues to 1106 where the adapter abstraction layer may instruct an adapter driver to configure the virtual function on the specified port with the specified parameters. The adapter driver may configure the virtual function using one of physical functions of the I/O adapter that uses the specified port. The adapter driver may provide the adapter abstraction layer with information associated with the configured virtual function.

Advancing to 1108, a determination may be made whether this virtual function was previously (i.e., already) configured. For example, the adapter abstraction layer may prevent a client application from attempting to configure the same virtual function (i.e., as identified by a DRC index of the virtual function) without first de-configuring the virtual function. To illustrate, the client application may have a DRC index for use with a newly configured virtual function. The adapter abstraction layer may request a virtual function that is hosted by a physical function of the adapter driver that matches the client's requested attributes (e.g., port number, etc.) for the virtual function. The adapter abstraction layer may determine whether the client is making a new request (with a distinct DRC index) and whether the adapter driver fulfills the request with a previously unused virtual function from its pool (with distinct physical function and virtual function indexes). When the virtual configuration was previously configured, a message may be sent to the client application indicating that an error was encountered, at 1110, and the method may end, at 1122.

When the virtual configuration was not previously configured, the method proceeds to 1112 where the adapter abstraction layer may instruct the adapter driver to configure the operational parameters of the virtual function. For example, the adapter driver may configure the operational parameters of the virtual function based on a type of the virtual function (e.g., network interface virtual function, fiber channel virtual function, fiber channel over Ethernet virtual function). The adapter driver may modify any adapter-wide settings in a non-disruptive manner to satisfy the operational parameters (e.g., QoS) of the virtual function.

Proceeding to 1114, the adapter abstraction layer may send information associated with the virtual function to the hypervisor. For example, the adapter abstraction layer may send the DRC index of the virtual function (e.g., received from the client application), tables that index the physical functions and the virtual functions of the I/O adapter (e.g., maintained by the adapter driver), a routing identifier, and a parition identifier of the logical partition that will use the virtual function. The hypervisor may establish a mapping between the virtual function DRC index and the tables that index the physical functions and the virtual functions of the I/O adapter, the virtual function MMIO space addresses, the routing identifier, and the partition identifier.

Continuing to 1116, the adapter abstraction layer may mark the virtual function as "in use". This may be done to prevent the adapter driver from selecting the virtual function (and any associated static resources). The driver abstraction layer may mark the virtual function as "available" when the virtual function is de-configured. Advancing to 1118, the adapter abstraction layer may store data indicating a reduction in the available virtual functions (i.e., per adapter, per port, promiscuous mode, diagnostic mode, etc.) associated with the I/O adapter. Proceeding to 1120, the adapter abstraction layer may send a message to the client application indicating that the virtual function has been configured and is available for the logical partition to use and the method ends at 1122.

Figure 12:
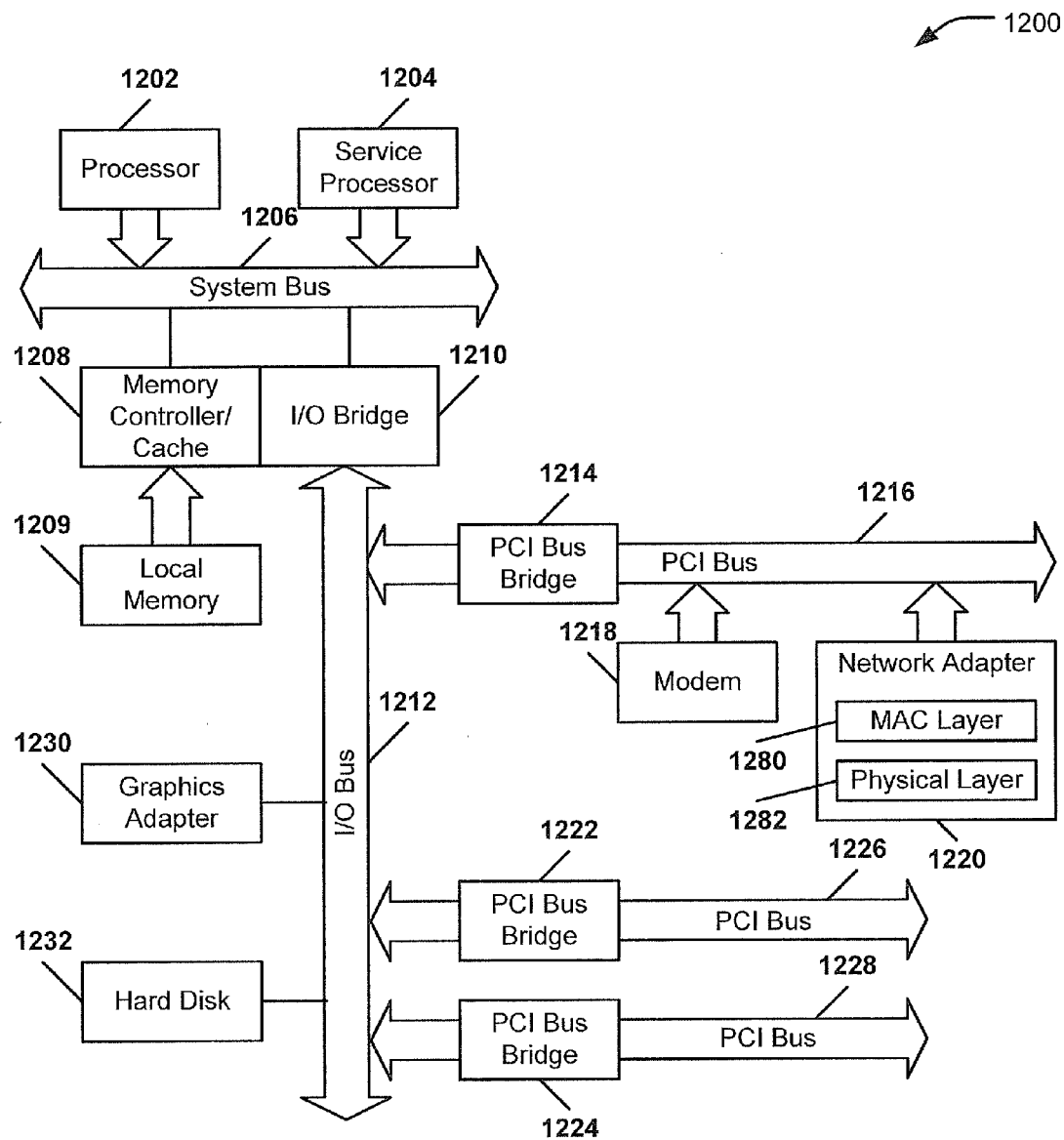
FIG. 12 is a block diagram of an illustrative embodiment of a general computer system.

Referring to FIG. 12, a block diagram of an illustrative embodiment of a general computer system is depicted and generally designated 1200. The data processing system 1200 may be a symmetric multiprocessor (SMP) system that includes a plurality of shared processors or SMT-capable processors, such as processors 1202 and 1204 connected to system bus 1206. Alternatively, a single processor system may be employed. In the depicted example, processor 1204 may be a service processor. Each SMT-capable processor may be capable of concurrently executing multiple hardware threads on the one processor.

Connected to system bus 1206 is memory controller/cache 1208, which provides an interface to local memory 1209. An I/O bus bridge 1210 is connected to a system bus 1206 to provide an interface to I/O bus 1212. A memory controller/cache 1208 and an I/O bus bridge 1210 may be integrated as depicted.

A peripheral component interconnect (PCI) bus bridge 1214 connected to I/O bus 1212 may provide an interface to PCI local bus 1216. Multiple modems may be connected to PCI bus 1216. Typical PCI bus implementations may support PCI expansion slots or add-in connectors. Communications links to network computers may be provided via modem 1218 and network adapter 1220 connected to PCI local bus 1216 through add-in boards.

Network adapter 1220 may include a physical layer 1282 which enables analog signals to go out to a network, such as for example, an Ethernet network via an R45 connector. A media access controller (MAC) 1280 is included within network adapter 1220. Media access controller (MAC) 1280 is coupled to bus 1216 and processes digital network signals. MAC 1280 may serve as an interface between bus 1216 and physical layer 1282. MAC 1280 may perform a number of functions involved in the transmission and reception of data packets. For example, during the transmission of data, MAC 1280 may assemble the data to be transmitted into a packet that includes address and error detection fields. During the reception of a packet, MAC 1280 may disassemble the packet and perform address checking and error detection. In addition, MAC 1280 may perform encoding/decoding of digital signals prior to transmission, perform preamble generation/removal, and bit transmission/reception.

Additional PCI bus bridges 1222 and 1224 may provide interfaces for additional PCI buses 1226 and 1228, from which additional modems or network adapters may be supported. In this manner, data processing system 1200 may allow connections to multiple network computers. A memory-mapped graphics adapter 1230 and hard disk 1232 may be directly or indirectly connected to I/O bus 1212.

Service processor 1204 may interrogate system processors, memory components, and I/O bridges to generate and inventory the system 1200. Service processor 1204 may execute Built-In-Self-Tests (BISTs), Basic Assurance Tests (BATs), and memory tests on one or more of the elements in the system 1200. Any error information for failures detected during the BISTs, BATs, and memory tests may be gathered and reported by service processor 1204.

Particular embodiments described herein may take the form of an entirely hardware embodiment, an entirely software embodiment or an embodiment containing both hardware and software elements. In a particular embodiment, the disclosed methods are implemented in software that is embedded in processor readable storage medium and executed by a processor, which includes but is not limited to firmware, resident software, microcode, etc.

Further, embodiments of the present disclosure, such as the one or more embodiments may take the form of a computer program product accessible from a computer-usable or computer-readable storage medium providing program code for use by or in connection with a computer or any instruction execution system. For the purposes of this description, a computer-usable or computer-readable storage medium may be any apparatus that may tangibly embody a computer program and that may contain, store, communicate, propagate, or transport the program for use by or in connection with the instruction execution system, apparatus, or device.

In various embodiments, the medium may include an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital versatile disk (DVD).

A data processing system suitable for storing and/or executing program code may include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) may be coupled to the data processing system either directly or through intervening I/O controllers. Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

What is claimed is:

1. A computer-implemented method, comprising:
   initializing a driver associated with an input/output adapter in response to receiving an initialize driver request from a client application;
   initializing the input/output adapter to enable adapter capabilities of the input/output adapter to be determined;
   determining the adapter capabilities of the input/output adapter, wherein determining the adapter capabilities of the input/output adapter comprises receiving a maximum number of virtual functions associated with the input/output adapter from an adapter driver associated with the input/output adapter;
   determining slot capabilities of a slot associated with the input/output adapter; and
   setting configurable capabilities of the input/output adapter based on the adapter capabilities and the slot capabilities.

2. The computer-implemented method of claim 1, wherein the configurable capabilities include the maximum number of virtual functions associated with the input/output adapter.

3. The computer-implemented method of claim 1, wherein setting the configurable capabilities of the input/output adapter comprises setting the maximum number of virtual functions that are configurable by the client application.

4. The computer-implemented method of claim 1, further comprising associating at least one interrupt source with at least one of the virtual functions.

5. The computer-implemented method of claim 1, wherein the configurable capabilities include a maximum number of virtual functions associated with at least one port of the input/output adapter.

6. The computer-implemented method of claim 5, wherein determining the adapter capabilities of the input/output adapter comprises receiving the maximum number of virtual functions associated with at least one port of the input/output adapter from the adapter driver associated with the input/output adapter.

7. The computer-implemented method of claim 5, wherein setting the configurable capabilities of the input/output adapter comprises setting the maximum number of virtual functions associated with the at least one port of the input/output adapter that is configurable by the client application.

8. A computer program product comprising a non-transitory computer usable medium having computer usable program code embodied therewith, the computer usable program code executable by a processor to:
   initialize a driver associated with an input/output adapter in response to receiving an initialize driver request from a client application;
   initialize the input/output adapter to enable adapter capabilities of the input/output adapter to be determined;
   determine the adapter capabilities of the input/output adapter;
   determine slot capabilities of a slot associated with the input/output adapter; and
   set configurable capabilities of the input/output adapter based on the adapter capabilities and the slot capabilities, the configurable capabilities including a maximum number of virtual functions associated with the input/output adapter and a maximum number of virtual functions associated with each port of the input/output adapter, wherein determining the adapter capabilities of the input/output adapter comprises receiving the maximum number of virtual functions associated with the input/output adapter from an adapter driver associated with the input/output adapter.

9. The computer program product of claim 8, wherein the computer usable program code is further executable by the processor to set the maximum number of virtual functions for at least one port of the input/output adapter that is configurable by the client application based on the adapter capabilities and the slot capabilities.

10. The computer program product of claim 8, wherein the computer usable program code is further executable by the processor to set the maximum number of virtual functions that are configurable by the client application based on the adapter capabilities and the slot capabilities.

11. The computer program product of claim 8, wherein the computer usable program code is further executable by the processor to associate at least one interrupt source with at least one of the virtual functions associated with the input/output adapter.

12. The computer program product of claim 8, wherein the computer usable program code is further executable by the processor to determine the adapter capabilities of the input/output adapter by receiving the maximum number of virtual functions for at least one port of the input/output adapter from the adapter driver associated with the input/output adapter.

13. The computer program product of claim 8, wherein the computer usable program code is further executable by the processor to set the maximum number of virtual functions for at least one port of the input/output adapter that is configurable by the client application.

14. A system, comprising:
   a processor; and
   an adapter abstraction layer comprising computer usable program code that is stored at a non-transitory computer usable medium, the adapter abstraction layer executable by the processor to:
   initialize a driver associated with an input/output adapter in response to receiving an initialize driver request from a client application;
   initialize the input/output adapter to enable adapter capabilities of the input/output adapter to be determined;
   determine the adapter capabilities of the input/output adapter;
   determine slot capabilities of a slot associated with the input/output adapter; and
   set configurable capabilities of the input/output adapter based on the adapter capabilities and the slot capabilities, the configurable capabilities including a maximum number of virtual functions associated with the input/output adapter and a maximum number of virtual functions associated with each port of the input/output adapter, wherein determining the adapter capabilities of the input/output adapter comprises receiving the maximum number of virtual functions associated with the input/output adapter from an adapter driver associated with the input/output adapter.

15. The system of claim 14, wherein the adapter abstraction layer is further executable by the processor to set the maximum number of virtual functions for at least one port of the input/output adapter that is configurable by the client application based on the adapter capabilities and the slot capabilities.

16. The system of claim 14, wherein the adapter abstraction layer is further executable by the processor to set the maximum number of virtual functions that are configurable by the client application based on the adapter capabilities and the slot capabilities.

17. The system of claim 14, wherein the adapter abstraction layer is further executable by the processor to associate at least one interrupt source with at least one of the virtual functions associated with the input/output adapter.

18. The system of claim 14, wherein the computer usable program code is further executable by the processor to determine the adapter capabilities of the input/output adapter by receiving the maximum number of virtual functions for at least one port of the input/output adapter from the adapter driver associated with the input/output adapter.

19. The system of claim 14, wherein the adapter abstraction layer is further executable by the processor to set the maximum number of virtual functions for at least one port of the input/output adapter that is configurable by the client application.

* * * * *